(12) United States Patent
Tamura et al.

(10) Patent No.: US 6,355,717 B1
(45) Date of Patent: Mar. 12, 2002

(54) LAYERED SILICATE-CONTAINING COMPOSITE RESIN COMPOSITION, AND MOULDED BARRIER COMPOSITE RESIN

(75) Inventors: Kenji Tamura, Yokohama; Hirofumi Inoue, Kawasaki; Junichi Nakamura, Kawasaki; Masayuki Noguchi, Kawasaki; Tsuguo Ebata, Yokohama, all of (JP)

(73) Assignee: EMS-Chemie AG, Reichenauerstrasse (CH)

( * ) Notice: Subject to any disclaimer, the term of this patent is extended or adjusted under 35 U.S.C. 154(b) by 0 days.

(21) Appl. No.: 09/633,017

(22) Filed: Aug. 4, 2000

(30) Foreign Application Priority Data

Aug. 4, 1999 (JP) ............................................. 11-220591

(51) Int. Cl.$^7$ .............................. C08J 5/10; C08K 3/34; C08L 33/24
(52) U.S. Cl. ........................ 524/449; 524/444; 524/445; 524/442; 524/447; 524/448; 524/450
(58) Field of Search .................................. 524/444, 445, 524/442, 443, 446, 447, 448, 449, 450

(56) References Cited

U.S. PATENT DOCUMENTS

| 3,656,981 A | * | 4/1972 | Beschke et al. | 106/288 B |
| 5,248,720 A | * | 9/1993 | Deguchi et al. | 524/444 |
| 5,378,275 A | * | 1/1995 | Shiraga et al. | 106/417 |
| 6,172,148 B1 | | 1/2001 | Weber et al. | |

* cited by examiner

*Primary Examiner*—James J. Seidleck
*Assistant Examiner*—U. K. Rajguru
(74) *Attorney, Agent, or Firm*—Banner & Witcoff, Ltd.

(57) ABSTRACT

The present invention provides barrier composite resin compositions and moulded bodies, comprising (a) aromatic polyamide resins or polyamide resin compositions containing at least one aromatic polyamide resin, and (b) a layered silicate modified by a triazine compound derivative.

8 Claims, No Drawings

LAYERED SILICATE-CONTAINING COMPOSITE RESIN COMPOSITION, AND MOULDED BARRIER COMPOSITE RESIN

FIELD OF INVENTION

The present invention relates to polyamide-based resin compositions with good gas barrier properties.

BACKGROUND OF THE INVENTION

Polyamide resins have good heat resistance, gas barrier properties, transparency, oil resistance, shrinkability, and are broadly employed, e.g. for food packing material and automobile components. Recently, demands for a high degrees of food shelf stability, such as retort pouch treatment, have increased, and in particular demands for high gas barrier properties, slidability, and tear strength under high temperature conditions are required. However, the gas barrier properties of polyamide resins alone are not satisfying in comparison with ethylene-vinyl alcohol copolymers (EVOH), polyvinylidene chloride (PVDC), etc. Polyamide resins with better gas barrier properties are desirable.

SUMMARY OF THE INVENTION

It is the object of the present invention to find a solution to the above, and in particular to provide polyamide resin compositions with good gas barrier properties, hot water shrinkage, moulding shrinkage, slidability and tear strength.

It is an object of the present invention to provide polyamide resin compositions exhibiting good gas barrier properties even during water absorption, and moulded articles thereof. The present invention provides polyamide resin compositions with good gas barrier properties, good hot water shrinkage and good moulding shrinkage by the use of layered silicates that are subjected to a certain treatment with positively charged organic compounds.

The present invention provides barrier composite resin compositions and moulded bodies, comprising (A) aromatic polyamide resins or polyamide resin compositions containing at least one aromatic polyamide resin, and (B) a layered silicate modified by a triazine compound derivative.

DETAILED DESCRIPTION OF THE PREFERRED EMBODIMENTS

Aromatic polyamide resins employed in (A) aromatic polyamide resins or polyamide resin compositions containing at least one aromatic polyamide resin of the present invention, include polyamide resins with at least one aromatic ring at the backbone chain. They may be polyamide resins produced by polycondensation of aliphatic, cycloaliphatic, aromatic diamine compounds, such as hexamethylene diamine, decamethylene diamine, dodecamethylene diamine, 2,2,4- or 2,4,4-trimethylhexamethylene diamine, 1,3- or 1,4-bis(aminomethyl)cyclohexane, bis(p-aminocyclohexyl)methane, m- or p-xylylene, diamine and aliphatic, cycloaliphatic, aromatic dicarboxylic acid compounds, such as adipinic acid, suberic acid, sebacic acid, cyclohexane dicarboxylic acid, terephthalic acid, isophthalic acid, 1,3-phenylenedioxyzine acetic acid, or by polycondensation of or under addition of amino carboxylic acid compounds, such as $\epsilon$-aminocaproic acid, 11-aminoundecanoic acid, 12-aminododecanoic acid, lactam compounds, such as $\epsilon$-caprolactam, enanthlactam, $\omega$-laurolactam.

Concrete examples are polyamide 6T, polyamide MXD6, polyamide 6I, and polyamide 6T/6I. Polyamide 6T, polyamide 6I and polyamide 6T/6I are preferable. Polyamide 6T is obtained by polycondensation of hexamethylene diamine and terephthalic acid (T). Polyamide MXD6 is obtained by polycondensation of m-xylylene diamine (MXD) and adipinic acid. Polyamide 6I is obtained by polycondensation of hexamethylene diamine and isophthalic acid (I). Polyamide 6T/6I is polyamide resin obtained by polycondensation of hexamethylene diamine and terephthalic acid (T) and hexamethylene diamine and isophthalic acid (I).

One or many kinds of said aromatic polyamide resin may be employed; a mixture with any proportion of aliphatic polyamide resin, such as polyamide 6, polyamide 11, polyamide 12, polyamide 46, polyamide 66, polyamide 610, polyamide 612, is employable. If a higher gas barrier property is required, a proportion of aromatic polyamide resin in the polyamide resin composition of at least 50% by weight is preferable. The manner of blending is not particularly limited to one method. Suitable manner of blending, includes, but is not limited to, melt blending, solution blending, blending during polymerization, etc.

Layered silicate modified by a triazine compound derivative (B) of the present invention is obtainable by ion-exchange reaction of layered silicate and triazine compound derivatives.

The layered silicate are classified as phyllosilicates in mineralogical terms, and in particular 2:1 phyllosilicates made of two tetrahedral layers and one octahedral layer, and 1:1 phyllosilicates made of one tetrahedral layer and one octahedral layer. Examples of minerals for 2:1 phyllosilicates include smectite, vermiculite, mica, chlorites, and for examples of 1:1 phyllosilicates include kaolin, serpentine, etc. Examples of the smectite group include saponite, hectorite, sauconite, montmorillonite, beidellite, nontronite, and stevensite, etc. Examples of the vermiculite group include trioctahedral vermiculite and dioctahedral vermiculite, etc. Examples of the mica group include compositions such as phlogopite, biotite, lepidlite, muscovite, paragonite, chlorite, margarite, taeniolite, tetrasilicic mica, etc. All of the phyllosilicates in accordance with the present invention may be natural products, or synthetic ones produced using a suitable method, including hydrothermal method, melting method, solid phase method, etc.

The triazine compound derivatives in accordance with the present invention are reaction products of triazine compounds and Lewis acids.

Triazine compounds are compounds with a six-membered ring containing 3 nitrogen atoms; for example melamine compounds, cyanuric acid compounds, and melamine cyanurate compounds, etc.

Melamine compounds are compounds of the following chemical formula. In the formula, $R^1$ and $R^2$ which may be the same or different stand for hydrogen atom, methyl group, ethyl group, methylene group, ethylene group, phenyl group, benzyl group or halogenophenyl group, etc. More particular examples include melamine, N-ethylene melamine, and N,N',N"-triphenyl melamine, etc.

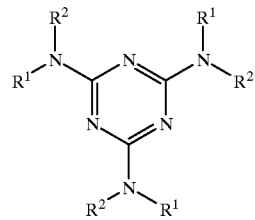

Cyanuric acid compounds are those of the following chemical formulae. In the following formulae, $R^3$ which may be the same or different stand for hydrogen atom or a lower alkyl group. In the present invention, hydrogen atom as $R^3$ is preferable. More particular examples of cyanuric acid compounds include cyanuric acid, isocyanuric acid, trimethylcyanurate, trismethylisocyanurate, triethylcyanurate, trisethylisocyanurate, tri(n-propyl)cyanurate, tris(n-propyl)isocyanurate, diethylcyanurate, N,N'-diethylisocyanurate, methylcyanurate, methylisocyanurate, etc.

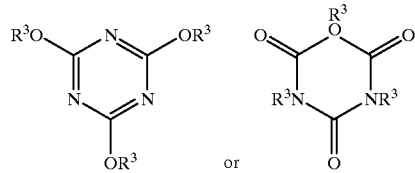

Melamine cyanurate compounds are equivalent mol reaction products of melamine compounds and cyanuric acid compounds. They can, for instance, be produced by mixing an aqueous solution of melamine and an aqueous solution of cyanuric acid, and then stirring the mixture at a temperature of ca. 90 to 100°C. The generated precipitate is then filtered off. The product is white solid, and can be crushed into fine powder for use. Alternatively, commercial product may be used as is or in crushed form.

Lewis acid compounds are electron pair acceptors. Examples are hydrogenic acids, such as hydrochloric acid, hydrogen sulfide, etc.; oxoacids, such as sulphuric acid, nitric acid, acetic acid and phosphoric acid; thioacids, such as ethylxantogen acid, etc.; alkyl halides; and acid halides. The amount of Lewis acid employed is in the range of 0.01 to 3 mo vis-À-vis mol of triazine compounds.

Various methods can be used for mixing said layered silicates and triazine compound derivatives to obtain the layered silicate modified by a triazine compound derivative of the present invention. For example, suitable methods include bringing the layered silicates and triazine compound derivatives into contact via a medium with affinity to both, and methods of directly mixing them without the use of a medium. For the case where a medium is used, components can be dispersed in a solvent to homogenize them, then they can be subsequently mixed with stirring, and the solvent can be removed to obtain the product. For the case where the components are directly mixed, both components can be simultaneously put into a ball mill or a mortar, and crushed to provide the product.

The incorporation amount of triazine compounds in the layered silicate modified by a triazine compound derivative is preferably 0.3 to 5 equivalent amount of cation exchange capacity (hereinafter designated as CEC) of the layered silicate, and the range of 0.5 to 2.0 equivalent is most preferable. With less than 0.3 equivalent of the incorporation amount, the dispersion of the intercalation compounds in the resin composition is reduced, whereas with 5 equivalent or more, it is feared that an excess amount of triazine compounds may cause poor appearance of moulded articles by bleeding out during moulding or deterioration of physical properties. Since the CEC of layered silicates varies depending on species, places of production, compositions, etc., the CEC must be previously determined. Known measurement methods for the CECs, are, for instance, the column permeation method (refer to "Nendo Handbook" second version, edited by Nihon Nendogakkai, pp. 576–577, published by Gihohdoh Shuppan), and the methylene blue absorption method (Nihon Bentonite Kogyokai standar test method, JBAS-107-91).

To confirm the inclusion of triazine compounds in layered silicate modified by triazine compound derivative, a sample is subjected to powder X-ray diffraction (XRD) and thermogravimetric analysis (TG/DTA), wherefrom inclusion can be deduced. Bottom surface interval distance d (001) is increased by intercalated triazine compounds.

The amount of layered silicate modified by a triazine compound derivative contained in polyamide resin is 0.5 to 40% by weight, in particular 1 to 10% by weight is preferable. With less than 0.5% by weight, improvement of gas barrier property, mechanical strength and heat resistance is poor; whereas with amount exceeding 40% by weight, moulding property may be less favourable.

Joining of layered silicate modified by a triazine compound derivative and polyamide resin, may be achieved by bringing the silicate into the polymerization location during polymerization of the polyamide resin or by kneading polyamide resin and the silicate within a melt kneading device, etc. Examples of melt kneading devices include continuous mixer, Bunbary mixer, roll, single extruder, twin extruder, tandem-type extruder, etc.

The gas barrier property of the moulded composite resin of the present invention can be any suitable shape, including but not limited to e.g., film, sheet, bottle, tank, etc., for a wide variety applications requiring compositions with good gas barrier properties. It is possible to laminate the present moulded resin together with other thermoplastic resins, such as polyethyelene, polypropylene, acid anhydride, graft modified ethylene/α-olefin copolymer polyolefines, polyvinyl chloride, ionomer resin, polyester resin, etc.

EXAMPLES

Hereinafter examples of the present invention are given. The present invention however is not limited to these examples.

As polyamide resin, aromatic polyamide 6I/6T (6I/6T=7/3, hereinafter designated as "PA-1") with a relative viscosity of 2.7, polyamide 6 with a relative viscosity of 2.6 (hereinafter "PA-2"), and polyamide 12 with a relative viscosity of 2.4 (hereinafter "PA-3") were employed.

Layered silicate modified by a triazine compound derivative were prepared by the following methods:

TABLE 1

| No | | PA-1 (wt-%) | PA-2 (wt-%) | PA-3 (wt-%) | SC-1 (wt-%) | SC-2 (wt-%) | TALC タルク (wt-%) | Oxygen Gas Permeation Rate 酸素透過率 ($cm^3/m^2 \cdot 24\ h \cdot 1\ atm$) 23° C., 50% RH | 23° C., 90% RH |
|---|---|---|---|---|---|---|---|---|---|
| Example | | | | | | | | | |
| 実施例 | 1 | 97 | — | — | 3 | — | — | 12.1 | 13.5 |
| 実施例 | 2 | 93 | — | — | 7 | — | — | 6.9 | 8.8 |
| 実施例 | 3 | 60 | 37 | — | 3 | — | — | 15.1 | 33.6 |
| 実施例 | 4 | 60 | 33 | — | 7 | — | — | 8.0 | 29.6 |
| 実施例 | 5 | 60 | 37 | — | — | 3 | — | 18.2 | 36.5 |
| 実施例 | 6 | 60 | — | 33 | 7 | — | — | 63.1 | 75.8 |
| Comparative Example | | | | | | | | | |
| 比較例 | 1 | 100 | — | — | — | — | — | 23.8 | 30.0 |
| 比較例 | 2 | 60 | 40 | — | — | — | — | 35.7 | 60.2 |
| 比較例 | 3 | 60 | — | 40 | — | — | — | 189.5 | 220.0 |
| 比較例 | 4 | — | 97 | — | 3 | — | — | 16.6 | 54.2 |
| 比較例 | 5 | 90 | — | — | — | — | 10 | 19.2 | 28.3 |

"SC-1": 200 g of synthetic sodium tetrasilic mica (ion exchange capacity: 107 meq/100 g; "SOMASIF ME-100" manufactured by Coop Chemical K.K.) were mixed with 4000 cc of distilled water and sufficiently swelled. This dispersion was heated to 60° C., an aqueous melamine chloride solution of 60° C. was added thereto in an amount of 1.0 equivalent relative to ion exchange capacity of the layered silicate, the mixture was sufficiently stirred to effect ion exchange reaction. The suspension was filtered; washing and filtration were repeated; and drying and crushing were conducted to provide layered silicate modified by a triazine compound derivative. The distance between layers of the obtained layered silicate modified by a triazine compound derivative was 1.3 nm, and cyanuric acid derivative content was 10% by weight.

"SC-2": In the same manner as above, layered silicate modified by a triazine compound derivative was prepared from 200 g of synthetic sodium tetrasilicon mica, cynuric acid (160 mmol) and hydrochloric acid. The distance between layers of the obtained layered silicate modified by a triazine compound derivative was 1.3 nm, and cyanuric acid derivative content was 15% by weight.

For comparison, talc (average particle size D50=2.0 μm; 5000SA manufactured by Hayashi Kasei K.K.) was employed.

Oxygen gas permeation evaluation:

In line with ASTM D3985, an oxygen permeation rate was measured by MOCON 0 X-TRAN 100A manufactured by Modern Control. The measurement condition was 23° C., 50% RH and 90% RH.

Examples 1 to 6, Comparative Examples 1 to 5:

Components were blended in amounts shown in Table 1, and the mixture was melted and kneaded by a twin extruder (PCM30 manufactured by K.K. Ikegai) to provide pellets of composite resin composition. Obtained pellets were moulded into film by T-dieing at 240° C. in an extruder, the film was solidified on a roll of 90° C. to form a film of 40 μm thickness. The oxygen gas pemeration rates are set forth in Table 1.

What is claimed:

1. A composite resin composition, comprising:
   (a) an aromatic polyamide resin or polyamide resin composition containing at least one aromatic polyamide resin, and
   (b) layered silicate modified by a triazine compound derivative which is obtained by ion exchange between the silicate layers, with the triazine compound derivative having at least one group with positive charge.

2. The composite resin composition according to claim 1, containing 0.5 to 40% by weight of layered silicate modified by the triazine compound derivative.

3. The composite resin composition according to claim 1, wherein the incorporation of aromatic polyamide resin in the polyamide resin composition is 50% by weight or more.

4. The composite resin composition according to claim 2, wherein the incorporation of aromatic polyamide resin in the polyamide resin composition is 50% by weight or more.

5. A moulded barrier composite resin made of layered silicate modified by a triazine compound derivative and polyamide composite resin composition according to claim 1.

6. A moulded barrier composite resin made of layered silicate modified by a triazine compound derivative and polyamide composite resin composition according to claim 2.

7. A moulded barrier composite resin made of layered silicate modified by a triazine compound derivative and polyamide composite resin composition according to claim 3.

8. A moulded barrier composite resin made of layered silicate modified by a triazine compound derivative and polyamide composite resin composition according to claim 4.

* * * * *